May 31, 1932.  F. S. LAWRENCE  1,860,350
PRESSURE REGULATOR
Filed Oct. 2, 1930   2 Sheets-Sheet 1
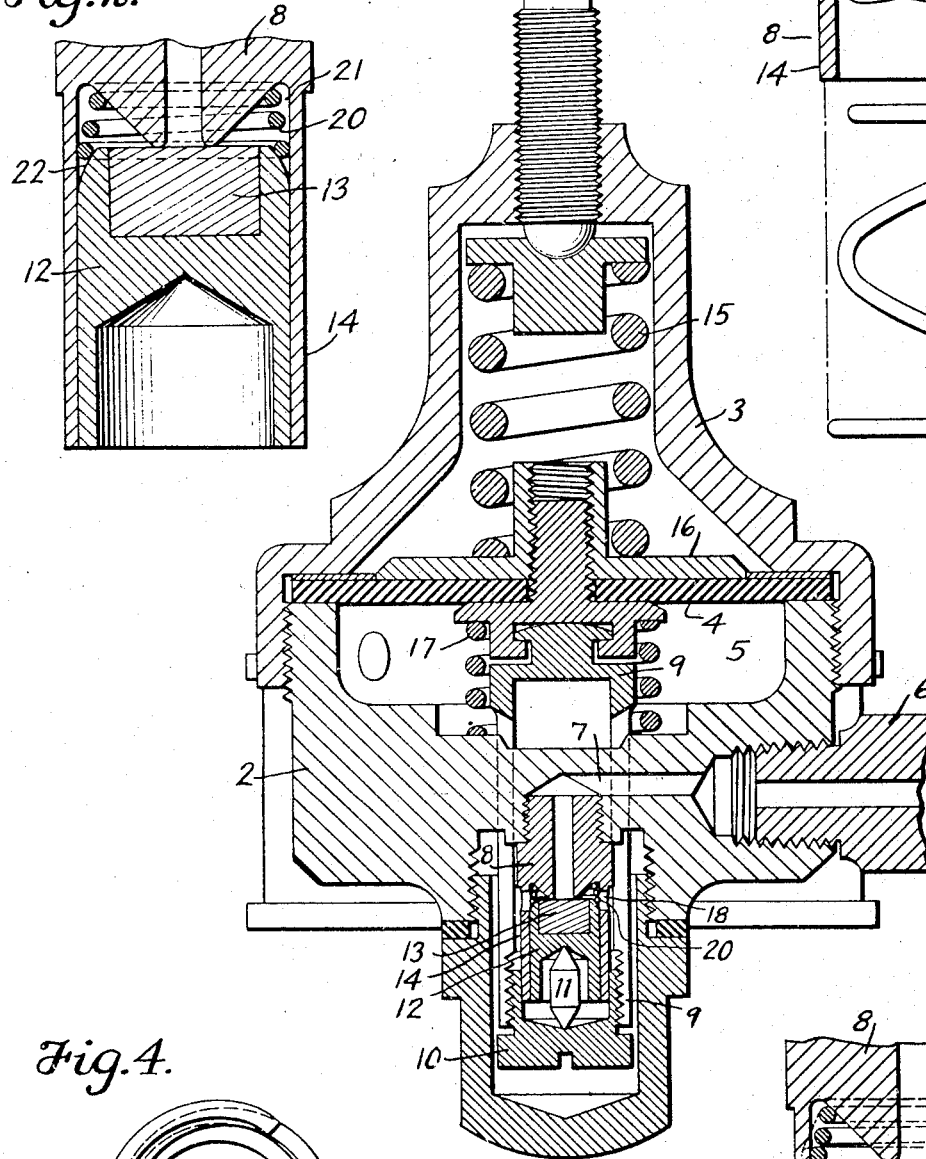
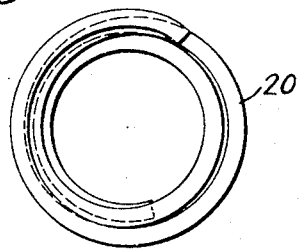
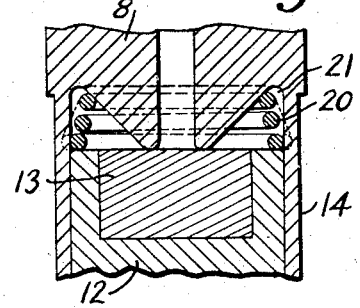
INVENTOR
Frank S. Lawrence
BY
ATTORNEY May 31, 1932.  F. S. LAWRENCE  1,860,350
PRESSURE REGULATOR
Filed Oct. 2, 1930   2 Sheets-Sheet 2

INVENTOR
Frank S. Lawrence
BY
ATTORNEY

Patented May 31, 1932

1,860,350

UNITED STATES PATENT OFFICE

FRANK S. LAWRENCE, OF DUNELLEN, NEW JERSEY, ASSIGNOR TO AIR REDUCTION COMPANY, INCORPORATED, OF NEW YORK, N. Y., A CORPORATION OF NEW YORK

PRESSURE REGULATOR

Application filed October 2, 1930. Serial No. 485,875.

Pressure regulators or reducing valves of the type having a rectilinearly guided valve member are subject to a condition of vibratory discharge which manifests itself as a humming, which in time may become a chatter. These conditions are not good for the regulator or for the regulation which is obtained, besides being disturbing to users of the apparatus.

The object of this invention is to overcome humming in such regulators in a very simple and effective manner. I find that this can be accomplished by interposing a light spring between the valve member, or other movable part related to the valve member, and some stationary part. The dampening effect of the spring may be due in some part to its acting as a resilient check to oscillation of the movable parts, but the plan which is relied upon is to form or dispose the spring in such manner that the diameter of its movable end as constrained laterally by the stationary part is different from its diameter when unconstrained, in consequence of which the slight movements of the valve mechanism cause the spring to rub on the stationary part, so that vibration is not set up. This action can be accentuated, or can be produced even if the spring does not tend to press to any substantial extent against the wall of the stationary part, by tapering the end of the movable part in a manner to wedge the end of the spring against the concentric wall of a guide.

In the accompanying drawings forming part hereof:

Fig. 1 is a section through a pressure regulator, in a plane of the axis, illustrating an embodiment of the invention;

Fig. 2 is an enlarged fragmentary section, showing the dampening spring more clearly;

Fig. 3 is a disassembled view showing the dampening spring in its normal or unconfined condition below a portion of the guide tube, in section, into which the spring is to be crowded;

Fig. 4 is a plan view of the spring;

Fig. 5 is a view similar to Fig. 2, but with no taper on the valve member, dotted lines being used to indicate the unconstrained diameter of the spring.

Figure 6:
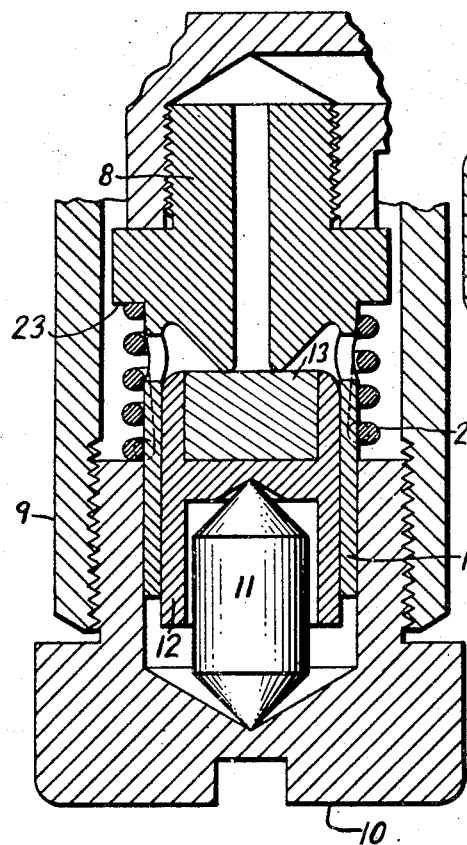
Figs. 6 and 7 are fragmentary sections illustrating other embodiments of the invention, the unconstrained diameter of the dampening spring being indicated by dotted lines.

Figs. 1 to 5 will now be described.

The regulator here illustrated is of a known type having a body 2, a cap 3, and a diaphragm 4 clamped between the body and the housing, this diaphragm forming one wall of the reduced-pressure chamber 5.

6 is the high pressure gas connection communicating with a passage 7 in the body, the latter in turn communicating with a nozzle 8. A stirrup 9 is connected or otherwise associated with the diaphragm, this stirrup carrying a cup 10 at its lower end, a thrust pin 11 being interposed between this cup and the valve member 12 which cooperates with the nozzle. This valve member is usually referred to as a seat-holder, 13 being the seat. The valve member is guided in a tube 14 which projects from around the nozzle lip.

15 is the regulating spring bearing against the diaphragm plate 16 at the outer side of the diaphragm, and 17 is a compensating spring, the function of which in the particular type of regulator illustrated is to balance off the pressure of the high pressure gas acting against the seat or valve member. When the seat is allowed to move away from the nozzle owing to the pressure of the spring 15, the gas which escapes from the nozzle passes through the holes 18 at the base of the tube 14, and through the openings in which the limbs of the stirrup 9 play, and thus to the chamber 5. When the pressure in the chamber 5 tends to rise above the value for which the regulator is set, its pressure against the diaphragm causes the latter to raise the stirrup and the valve member, or permits the spring 17 to do so, bringing the seat 13 against the nozzle lip.

The provision against humming consists of a very light helical spring 20, of few convolutions, which is inserted into the guide tube 14 before the valve member 12 is introduced, so that when the regulator is assembled the convolutions of this spring are brought close together in the small space 21 surrounding the nozzle lip. The spring is therefore under compression and exerts resistance, of a moderate order, to movement of the valve member toward the nozzle. One end of the spring reacts against the stationary nozzle outside of the lip, and the other end reacts against the movable valve member.

Figs. 3 and 5 illustrate the fact that the movable end of the spring, when unconstrained, is of larger diameter than the bore of the tube 14. This causes the spring to press outward against the confining wall of the tube, so that it rubs against the stationary guide when the valve member executes its small to and fro movements. This resilient and frictional effect will entirely suppress humming.

Fig. 2 shows the valve member 12 as having a tapered upper end 22, forming a wedge-like recess between it and the wall of the guide 14. In this way the valve member may be utilized to crowd the movable end or convolution of the spring outward against the tube, producing or contributing to the rubbing action which has been described.

The convolutions of the dampening spring 20 are of different diameters, the upper convolution, which seats around the nozzle lip, being the smallest, and the lower convolution, which bears against the valve member being the largest. When the seat 13 becomes indented, and the spring is therefore compressed into a smaller and smaller space, the convolutions will fall more or less within each other and will not close against each other so as to keep the seat from coming against the nozzle.

Fig. 6 illustrates a modification in which a helical dampening spring 20ª is placed outside the stationary guide-tube 14. In this case the upper end of the spring bears against an external shoulder 23 on the stationary nozzle, while its lower end bears against the movable cup 10. This spring is so formed that its lower convolution or convolutions are normally smaller in diameter than the outside of the tube, and must be spread in order to be put over the tube. Consequently when the movable valve mechanism moves to and fro the part of the spring clasping the stationary guide rubs and produces the same dampening effect as in the form first described.

Figure 7:
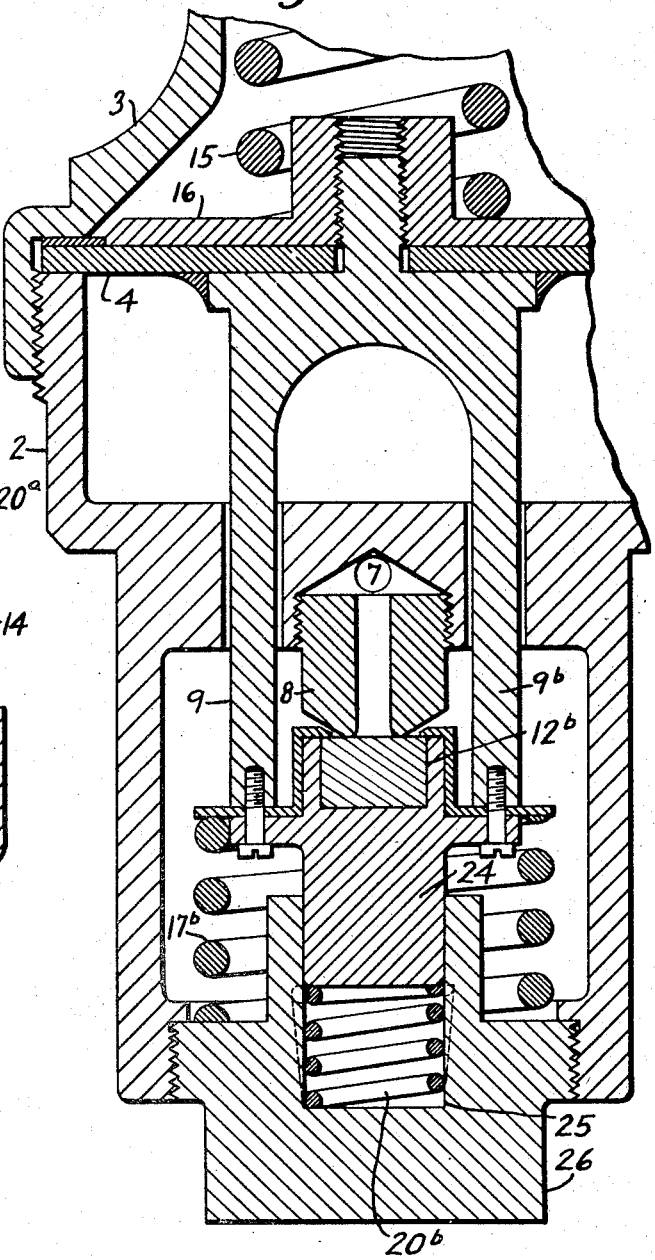

In Fig. 7 a somewhat different regulator construction is illustrated. The valve member or seat holder 12ᵇ is secured to the lower end of the stirrup 9ᵇ and has a downward extension 24 which is guided in the guide chamber 25 of a stationary part 26. The dampening spring 20ᵇ reacts between the bottom of this chamber and the lower end of the extension 24. As shown in dotted lines, the upper, or movable, end of the spring when unconstrained, is larger than the diameter of the guide chamber, so as to rub against its wall.

In this last form the light endwise pressure of the dampening spring urges the seat against the nozzle. This may be taken into account by causing the compensating spring 17ᵇ to exert less pressure than would otherwise be desirable. In such an arrangement it is conceivable that the compensating spring might be omitted, the dampening spring being then made heavy and strong enough to serve as a compensating spring in addition to its anti-humming function.

I claim:

1. In a pressure regulator, the combination with a diaphragm, a nozzle, a guide tube extending from around the nozzle, and means associated with the diaphragm to control the passage of gas from the nozzle, said means having a valve element guided in said tube to coact with said nozzle, of a dampening spring interposed between said nozzle and said valve element, said spring being constrained by the wall of the tube so as to bear resiliently and rub against said wall in a manner to suppress humming.

2. In a pressure regulator, the combination with a diaphragm, a nozzle, a guide tube extending from around the nozzle, and means associated with the diaphragm to control the passage of gas from the nozzle, said means having a valve element guided in said tube to coact with said nozzle, of a helical dampening spring interposed between said nozzle and said valve element, the lower end of said spring when unconstrained being larger than the internal diameter of said guide tube, so that it is crowded in said tube and exerts a rubbing action thereon.

3. In a pressure regulator, the combination with a diaphragm, a nozzle, a guide tube extending from around the nozzle, and means associated with the diaphragm to control the passage of gas from the nozzle, said means having a valve element guided in said tube to coact with said nozzle, of a helical dampening spring interposed between said nozzle and said valve element and constrained to exert a rubbing action under the influence of the movements of the valve element, the convolutions of said spring being of different diameters.

4. In a pressure regulator having a diaphragm forming a wall of a reduced-pressure chamber, valve means associated with the diaphragm to control the passage of fluid through an orifice between the high-pressure passage and the reduced-pressure chamber, said means comprising a rectilinearly guided part, and a stationary part in relation to which the movable part is guided, a helical dampening spring reacting between said stationary and movable parts, the movable end of said spring being constrained by the stationary part to a diameter other than its diameter in the unconstrained state, in order to rub against the wall of the stationary part.

5. In a pressure regulator having a diaphragm forming a wall of a reduced-pressure chamber, valve means associated with the diaphragm to control the passage of fluid through an orifice between the high-pressure passage and the reduced-pressure chamber, said means comprising a rectilinearly guided part, and a stationary part in relation to which the movable part is guided, a helical dampening spring reacting between said stationary and movable parts, the end of said valve member being tapered so as to wedge the movable end of said spring against the wall of the guide.

FRANK S. LAWRENCE.